Sept. 19, 1950 W. E. EMMERT 2,523,104
VENTILATING ATTACHMENT FOR VEHICLES
Filed Oct. 3, 1947 2 Sheets-Sheet 1

Inventor
Walter E. Emmert
By Clarence A. O'Brien
and Harvey B. Jacobson
Attorneys

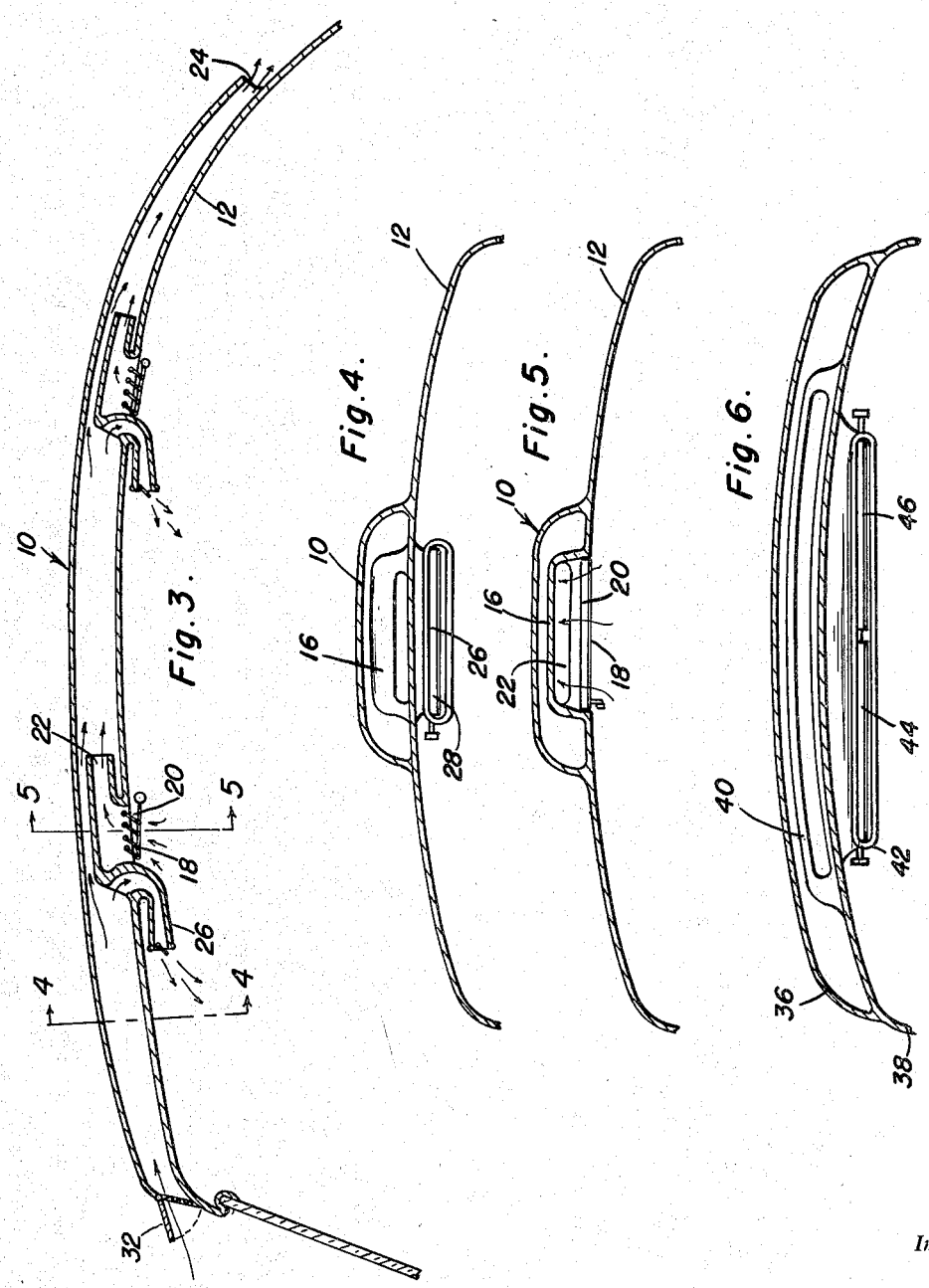

Patented Sept. 19, 1950

2,523,104

UNITED STATES PATENT OFFICE 2,523,104

VENTILATING ATTACHMENT FOR VEHICLES

Walter E. Emmert, Los Angeles, Calif.

Application October 3, 1947, Serial No. 777,788

3 Claims. (Cl. 98—2)

This invention relates to new and useful improvements in ventilating attachments for vehicles and the primary object of the present invention is to provide a conduit attachment for vehicle roofs that permits a regulated flow of air into and out of the interior of the vehicle body during movement of the vehicle, or while the vehicle is in a stopped position.

Another important object of the present invention is to provide a ventilating attachment of the class described including novel valve means for regulating the flow of air out of the body interior of the vehicle to which the same is applied.

A further object of the present invention is to provide a small, compact ventilating attachment for vehicles that is highly efficient in removing smoke or other undesirable odors that may be present in the interior of the vehicle body.

A still further aim of the present invention is to provide a device of the class described that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a longitudinal vertical sectional view taken upon line 3—3 of Figure 2;

Figure 4 is a vertical sectional view taken on line 4—4 of Figure 3;

Figure 5 is a vertical sectional view taken on line 5—5 of Figure 3; and

Figure 6 is a transverse vertical sectional view of a part of the vehicle roof, and the present invention in modified form applied thereto.

Figures 1, 2:
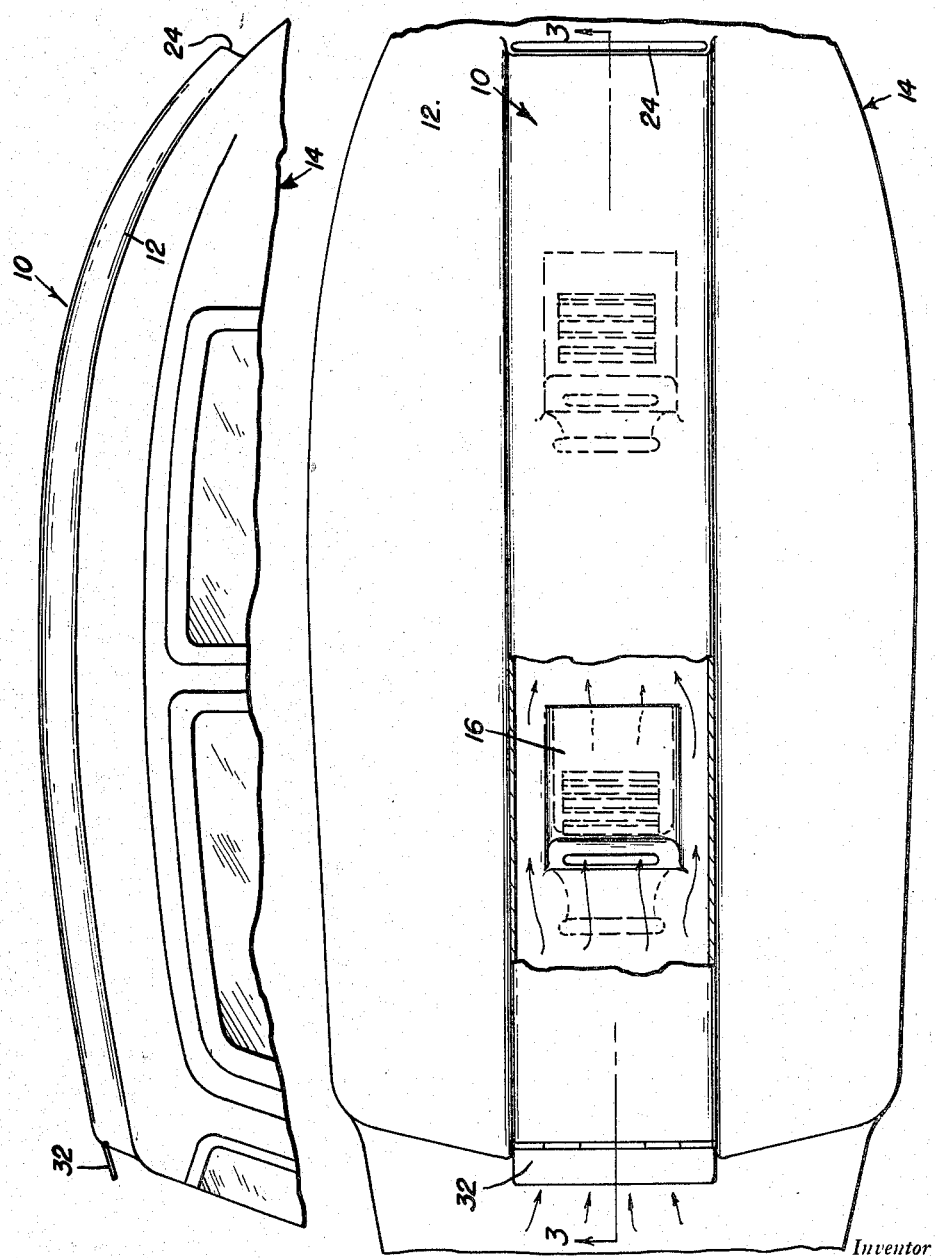
Figure 1 is a side elevational view of a vehicle, shown in part, with the present invention applied thereto.
Figure 2 is a fragmentary top plan view of Figure 1, with parts of the device broken away and shown in section.

Referring now to the drawing in detail, wherein for the purpose of illustration, there is disclosed a preferred embodiment of the present invention, the numeral 10 represents generally a longitudinal or main substantially channel shaped conduit, which is integrally formed with the roof 12 of the vehicle 14. However, the conduit may form a separate element which is suitably attached to the roof to conform to the curvature of the roof.

Within the conduit are hoods 16 which may be integrally formed with the roof, or suitably mounted on the roof. These hoods are provided with air vents 18 controlled by louvers 20 that furnish air outlet means for the interior of the body. The hoods 16 are further provided with a rearwardly extending tubular vent 22 for conducting the air from the interior of the body rearwardly through the conduit to the open rear end 24 of the conduit.

Forming a part of the hood and extending forwardly through the roof are auxiliary conduits 26, that furnish air inlet means into the interior of the vehicle body. Elongated strips or doors 28 are pivotally carried by the inner ends of these auxiliary conduits, and act as valves for regulating the entrance of air into the body, and for preventing the air within the body to pass outwardly through the auxiliary conduits.

The forward end 30 of the conduit 10 is provided with a hinged door 32 which may be raised or lowered by any suitable means to control the passage of air into the forward end of the conduit. The hoods each includes an upper wall and spaced side walls that are spaced from the top wall and side walls of the main conduit to provide a passage so that air may pass about the hoods. The forward ends of the hoods are closed by the curved walls of the auxiliary conduits.

In the practical use of the device, door 32 being open air enters the conduit and is conducted into the interior of the body by way of the duct 26, to the forward portion of the body interior.

To permit a regulated passage of air from the interior of the body, the louvers are adjusted by finger grips 34 and the air is conducted through the housings to the rear open end of the conduit, as best shown in Figure 3 of the drawings.

Figure 6 shows the device in slightly modified form, wherein the conduit 36 extends over the complete roof area 38. The hood 40 is of increased size and the auxiliary conduits 42 carried by the hoods hold a pair of louvers 44 and 46, for increasing the capacity of the conduit 36 for regulating the flow of air from the body interior through the conduit 36 and outwardly from its open rear end.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A ventilating attachment for a vehicle roof comprising a main substanially channel-shaped conduit carried by the roof and including open forward and rear portions, said roof having an outlet aperture entering the interior of said main conduit, a hood carried by the roof and mounted within the main conduit, said hood having a top wall spaced parallel to the upper wall of the main conduit and side walls spaced substantially parallel to the side walls of the main conduit to permit air to pass about and over the hoods, said hood having a lower open portion communicating with said aperture, said hood also having a rearwardly extending tubular vent spaced from the walls of said main conduit and confined within said main conduit, means associated with said hood controlling the flow of air through the aperture in said roof, an auxiliary conduit integrally formed with the hood and having a curved wall closing the front end of said hood, said auxiliary conduit including an upper portion disposed within and transversely of the main conduit, the upper portion of said auxiliary conduit having an opening for receiving air entering the main conduit, said auxiliary conduit including a lower portion extending downwardly through the roof, and additional means associated with the lower portion of said auxiliary conduit for controlling the flow of air passing from said lower portion.

2. The combination of claim 1 and a hinged closure at the forward portion of said main conduit for controlling the flow of air through the main conduit.

3. A ventilating attachment for a vehicle roof comprising a main substantially channel shaped conduit carried by the roof and including open forward and rear portions, said roof having a plurality of longitudinally spaced outlet apertures entering the interior of said main conduit, a plurality of hoods carried by the roof and mounted within the main conduit, each of said hoods having a top wall spaced parallel to the upper wall of the main conduit and side walls spaced substantially parallel to the side walls of the main conduit to permit air to pass about and over the hoods, each of said hoods having a lower open portion communicating with an aperture in said roof, each of said hoods also having a rearwardly extending tubular vent spaced from the walls of said main conduit and confined within said main conduit, means associated with each of said hoods controlling the flow of air through the apertures in said roof, an auxiliary conduit integrally formed with each of the hoods, each of said auxiliary conduits having a curved wall closing the front end of the hood it is integrally formed with, said auxiliary conduits each including an upper portion disposed within and transversely of the main conduit, the upper portions of said auxiliary conduits having openings for receiving air entering the main conduit, each of said auxiliary conduits including a lower portion extending downwardly through the roof, and additional means associated with the lower portions of said auxiliary conduits for controlling the flow of air passing from said lower portions.

WALTER E. EMMERT.

REFERENCES CITED

The following references are of record in the file of this patent:

UNITED STATES PATENTS

| Number | Name | Date |
| --- | --- | --- |
| 1,618,152 | Hutchins | Feb. 15, 1927 |
| 1,820,430 | Bombard et al. | Aug. 25, 1931 |
| 1,935,456 | McCarthy | Nov. 14, 1933 |
| 1,956,123 | Givens | Apr. 24, 1934 |
| 2,084,787 | Zaustinsky | June 22, 1937 |
| 2,087,651 | Mygland | July 20, 1937 |

FOREIGN PATENTS

| Number | Country | Date |
| --- | --- | --- |
| 342,217 | Germany | Oct. 14, 1921 |
| 214,287 | Great Britain | Apr. 16, 1924 |
| 330,878 | Great Britain | June 11, 1930 |
| 432,298 | Great Britain | July 24, 1935 |